(12) United States Patent
Tamao et al.

(10) Patent No.: US 12,348,076 B2
(45) Date of Patent: Jul. 1, 2025

(54) SOLAR CONTROL DEVICE AND METHOD, AND VEHICLE

(71) Applicant: TOYOTA JIDOSHA KABUSHIKI KAISHA, Toyota (JP)

(72) Inventors: Junichiro Tamao, Nagoya (JP); Tetsuro Nakamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 620 days.

(21) Appl. No.: 17/808,689

(22) Filed: Jun. 24, 2022

(65) Prior Publication Data

US 2022/0416565 A1 Dec. 29, 2022

(30) Foreign Application Priority Data

Jun. 29, 2021 (JP) .................. 2021-107498

(51) Int. Cl.
| | |
|---|---|
| *H02J 7/00* | (2006.01) |
| *B60L 8/00* | (2006.01) |
| *B60L 53/20* | (2019.01) |
| *H02J 7/35* | (2006.01) |
| *H02M 1/00* | (2006.01) |
| *H02M 1/32* | (2007.01) |

(52) U.S. Cl.
CPC ............ *H02J 7/35* (2013.01); *B60L 8/003* (2013.01); *B60L 53/20* (2019.02); *H02J 7/0013* (2013.01); *H02M 1/0009* (2021.05); *H02M 1/32* (2013.01); *B60L 2210/10* (2013.01); *H02J 7/00304* (2020.01); *H02J 7/00308* (2020.01); *H02J 2207/20* (2020.01)

(58) Field of Classification Search
USPC ............... 320/100, 101, 102, 103, 104, 105
See application file for complete search history.

(56) References Cited

U.S. PATENT DOCUMENTS

2012/0112684 A1* 5/2012 Xu ................... B60L 53/22
320/101
2016/0072281 A1* 3/2016 Izumi .................. H02J 3/381
307/66

FOREIGN PATENT DOCUMENTS

JP 2019170130 A 10/2019

* cited by examiner

*Primary Examiner* — Brian Ngo
(74) *Attorney, Agent, or Firm* — Dickinson Wright, PLLC

(57) ABSTRACT

A solar control device controls a solar power generation system having at least one first group including a solar panel and a first DC/DC converter and at least one second group including a second DC/DC converter and a battery. The solar control device includes an electronic control unit that sets an output command value for the second DC/DC converter such that the output command value periodically switches between a first value and a second value that is smaller than the first value, when an output of the second DC/DC converter is equal to or smaller than a threshold value, and determines that the second DC/DC converter is abnormal when the output command value and the output of the second DC/DC converter satisfy a predetermined condition.

11 Claims, 8 Drawing Sheets

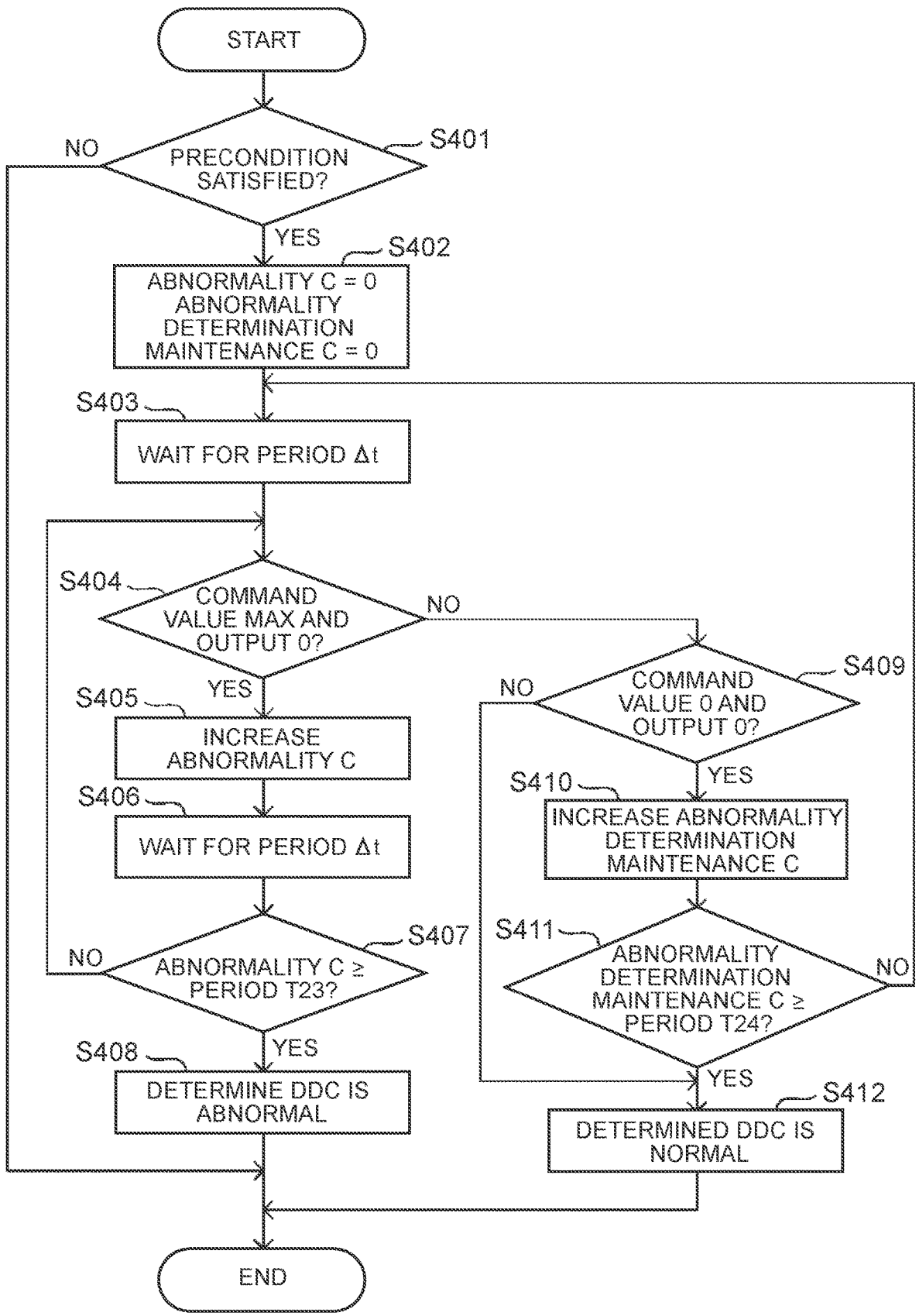

SOLAR CONTROL DEVICE AND METHOD, AND VEHICLE

CROSS-REFERENCE TO RELATED APPLICATION

This application claims priority to Japanese Patent Application No. 2021-107498 filed on Jun. 29, 2021, incorporated herein by reference in its entirety.

BACKGROUND

1. Technical Field

The present disclosure relates to solar control device and method for controlling a solar power generation system, and a vehicle including the solar power generation system.

2. Description of Related Art

As an example of a system to which this type of control device is applicable, a system that supplies electric power generated by solar panels installed in a vehicle to an onboard battery via DC/DC converters has been proposed (see Japanese Unexamined Patent Application Publication No. 2019-170130 (JP 2019-170130 A)).

SUMMARY

In the system described above, it is required to detect abnormalities in the DC/DC converters. In JP 2019-170130 A, there is no disclosure about detection of abnormalities in the DC/DC converters.

The present disclosure provides solar control device and method, and a vehicle, which can detect an abnormality in a DC/DC converter of a solar power generation system.

A solar control device according to one aspect of the present disclosure controls a solar power generation system having at least one first group including a solar panel and a first DC/DC converter and at least one second group including a second DC/DC converter and a battery. At least one of the at least one first group and the at least one second group is a plurality of the first groups or the second groups. The first DC/DC converter is configured to output electric power generated by the solar panel to a first power line, and the second DC/DC converter is configured to output electric power received via the first power line, to a second power line. The battery is connected to the second power line. The solar control device includes an electronic control unit configured to set an output command value for the second DC/DC converter such that the output command value periodically switches between a first value and a second value that is smaller than the first value, when an output of the second DC/DC converter is equal to or smaller than a threshold value, and determine that the second DC/DC converter is abnormal when the output command value and the output of the second DC/DC converter satisfy a predetermined condition.

A solar control method according to another aspect of the present disclosure is a method of controlling a solar power generation system having at least one first group including a solar panel and a first DC/DC converter and at least one second group including a second DC/DC converter and a battery, using an electronic control unit. At least one of the at least one first group and the at least one second group is a plurality of the first groups or the second groups. The first DC/DC converter is configured to output electric power generated by the solar panel to a first power line, and the second DC/DC converter is configured to output electric power received via the first power line, to a second power line. The battery is connected to the second power line. The solar control method includes setting an output command value for the second DC/DC converter by the electronic control unit such that the output command value periodically switches between a first value and a second value that is smaller than the first value, when an output of the second DC/DC converter is equal to or smaller than a threshold value, and determining by the electronic control unit that the second DC/DC converter is abnormal when the output command value and the output of the second DC/DC converter satisfy a predetermined condition.

A vehicle according to a further aspect of the present disclosure includes a solar power generation system, and a solar control device configured to control the solar power generation system. The solar power generation system has at least one first group including a solar panel and a first DC/DC converter and at least one second group including a second DC/DC converter and a battery. At least one of the at least one first group and the at least one second group is a plurality of the first groups or the second groups. The first DC/DC converter is configured to output electric power generated by the solar panel to a first power line, and the second DC/DC converter is configured to output electric power received via the first power line, to a second power line. The battery is connected to the second power line. The solar control device includes an electronic control unit configured to set an output command value for the second DC/DC converter such that the output command value periodically switches between a first value and a second value that is smaller than the first value, when an output of the second DC/DC converter is equal to or smaller than a threshold value, and determine that the second DC/DC converter is abnormal when the output command value and the output of the second DC/DC converter satisfy a predetermined condition.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a flowchart illustrating a DDC output stopped state detection process according to the second embodiment;

DETAILED DESCRIPTION OF EMBODIMENTS

First Embodiment

Figure 1:
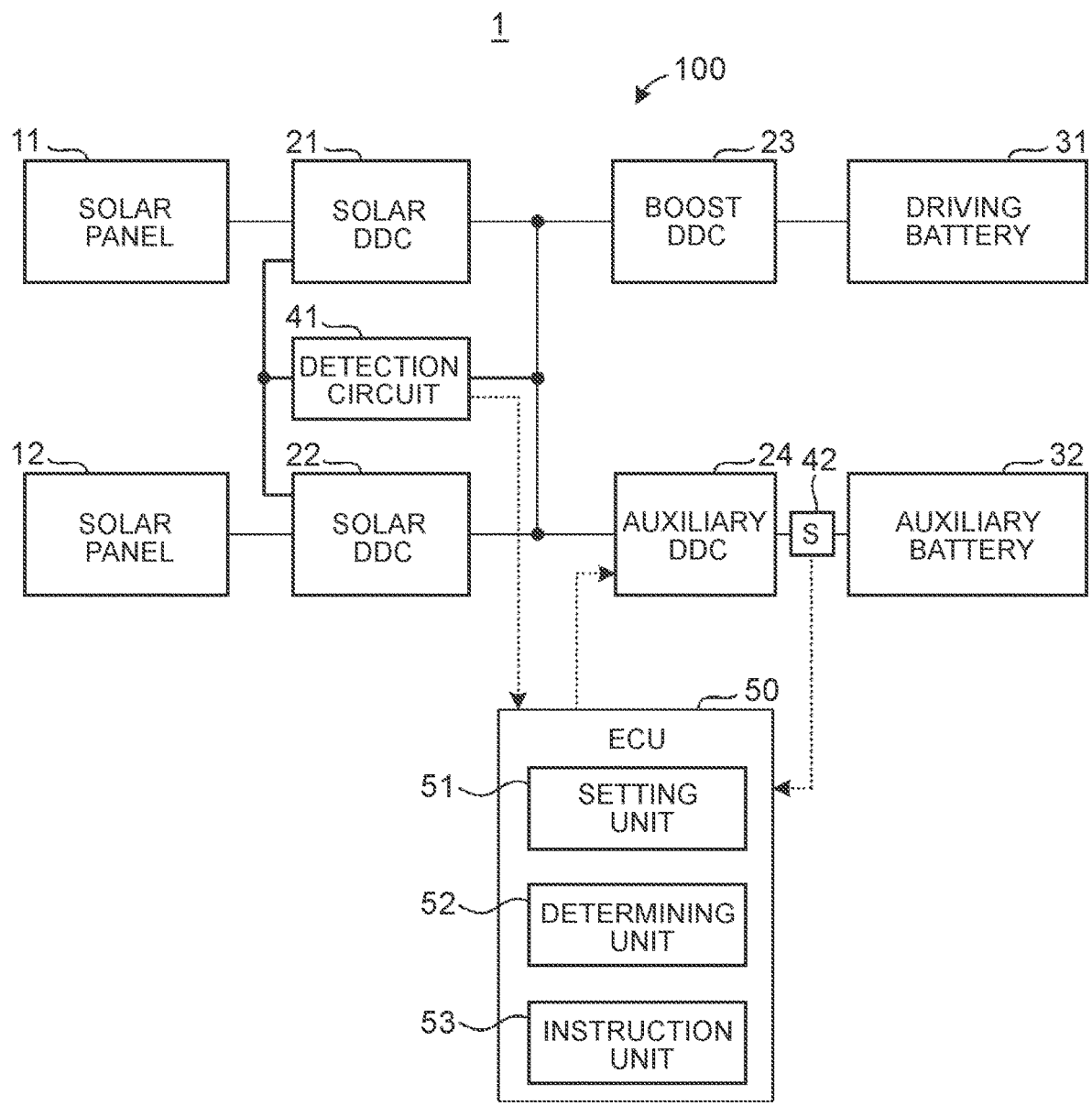
FIG. 1 is a view showing the configuration of a solar power generation system according to a first embodiment.

A solar control device for controlling a solar power generation system 100 installed in a vehicle 1 according to a first embodiment will be described with reference to FIG. 1 to FIG. 4. The vehicle 1 will be described with reference to FIG. 1. In FIG. 1, the vehicle 1 includes the solar power generation system 100.

The solar power generation system 100 has solar panels 11, 12 disposed on a roof, or the like, of the vehicle 1, for example. The solar power generation system 100 has a solar DC/DC converter 21 (which will be referred to as "solar DDC 21" when appropriate) electrically connected to the solar panel 11, and a solar DC/DC converter 22 (which will be referred to as "solar DDC 22" when appropriate) electrically connected to the solar panel 12.

The solar power generation system 100 has a boost DC/DC converter 23 (which will be referred to as "boost DDC 23" when appropriate) having one end electrically connected to the solar DDCs 21, 22 and the other end electrically connected to a driving battery 31, and an auxiliary DC/DC converter 24 (which will be referred to as "auxiliary DDC 24" when appropriate) having one end electrically connected to the solar DDCs 21, 22 and the other end electrically connected to an auxiliary battery 32.

The driving battery 31 supplies electric power to a motor (not shown) for driving the vehicle 1. The auxiliary battery 32 supplies electric power to various auxiliary machines (not shown) installed in the vehicle 1. The solar power generation system 100 has a detection circuit 41 that detects at least one of overvoltage and overcurrent, and a sensor 42 that detects at least one of output current and output voltage of the auxiliary DDC 24.

An electronic control unit (ECU) 50 controls the solar DDCs 21, 22, boost DDC 23, and auxiliary DDC 24 of the solar power generation system 100. During traveling of the vehicle 1, for example, the ECU 50 controls the solar DDCs 21, 22, boost DDC 23, and auxiliary DDC 24, so that the power generated by the solar panels 11, 12 is supplied to the auxiliary battery 32, but is not supplied to the driving battery 31. While the vehicle 1 is stopped, for example, the ECU 50 controls the solar DDCs 21, 22, boost DDC 23, and auxiliary DDC 24, so that the power generated by the solar panels 11, 12 is supplied to the driving battery 31, but is not supplied to the auxiliary battery 32.

The amount of power generated by the solar panels 11, 12 is influenced by factors external to the vehicle 1, such as weather. Also, there may be an abnormality in a circuit such as the auxiliary DDC 24. Then, when supply of the power to the auxiliary battery 32 is stopped, for example, it is difficult to determine whether the stop of the power supply is caused by the amount of power generated by the solar panels 11, 12, or caused by the circuit such as the auxiliary DDC 24.

In this embodiment, a method of controlling the solar power generation system 100 with which the reason why the power supply to the auxiliary battery 32, for example, is stopped can be specified will be described. The ECU 50 as an example of the solar control device according to this embodiment incorporates a setting unit 51, a determining unit 52, and an instruction unit 53, as logically realized processing blocks or physically realized processing circuits.

The ECU 50 executes a solar power generation stopped state detection process and a DDC output stopped state detection process in parallel, so as to specify the reason why the power supply to the auxiliary battery 32 is stopped.

Solar Power Generation Stopped State Detection Process

Figure 2:
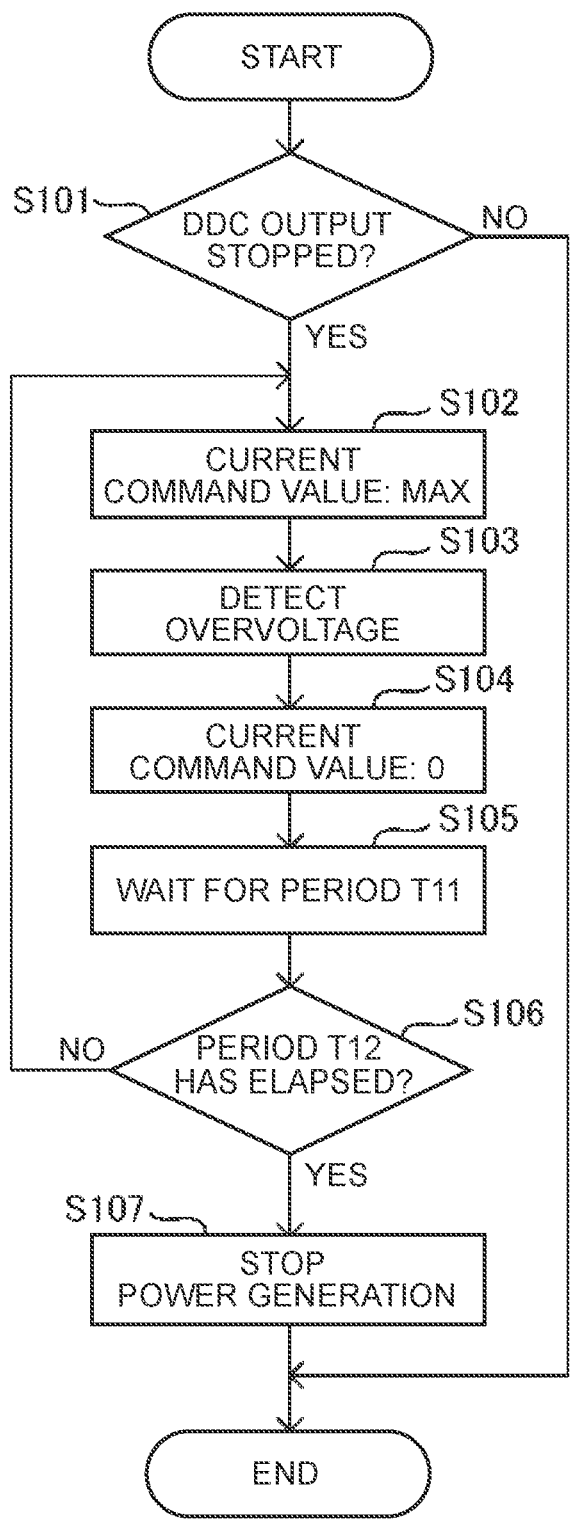
FIG. 2 is a flowchart illustrating a solar power generation stopped state detection process according to the first embodiment.

The solar power generation stopped state detection process according to the first embodiment will be described with reference to the flowchart of FIG. 2. In FIG. 2, the determining unit 52 of the ECU 50 determines whether output of the auxiliary DDC 24 is stopped, without depending on a command of the ECU 50 (step S101).

Here, the determining unit 52 may determine that output of the auxiliary DDC 24 is stopped, when the value of the output current detected by the sensor 42 is equal to or smaller than a threshold current value (e.g., zero). The "threshold current value" is a value that determines whether output of the auxiliary DDC 24 is stopped, and is set in advance as a fixed value or as a variable value that can vary according to some physical quantity or parameter. The relationship between the operating state of the auxiliary DDC 24 and the output current value may be obtained empirically, experimentally, or by simulation, for example, and the "threshold current value" may be set as the output current value at the time when the auxiliary DDC 24 is in an output stopped state, based on the relationship thus obtained.

When the determining unit 52 determines in step S101 that the output of the auxiliary DDC 24 is not stopped (NO in step S101), the process shown in FIG. 2 ends. Then, step S101 may be executed after a lapse of a first predetermined time. Namely, the process shown in FIG. 2 may be repeatedly performed at intervals of the first predetermined time.

When the determining unit 52 determines in step S101 that the output of the auxiliary DDC 24 is stopped (YES in step S101), the setting unit 51 of the ECU 50 sets a current command value for the auxiliary DDC 24 to the maximum value. The instruction unit 53 of the ECU 50 generates the current command value set by the setting unit 51, to the auxiliary DDC 24 (step S102). At this time, the setting unit 51 keeps the current command value at the maximum value for a period T15 (e.g., 30 milliseconds).

As a result of execution of step S102, overvoltage is detected by the detection circuit 41 (step S103), and the setting unit 51 sets the current command value for the auxiliary DDC 24 to zero after a lapse of the above period T15. The instruction unit 53 generates the current command value set by the setting unit 51 to the auxiliary DDC 24 (step S104).

After execution of step S104, the ECU 50 waits for a period T11 (e.g., 100 milliseconds) (step S105). Then, the determining unit 52 determines whether a period T12 (e.g., 3000 milliseconds) has elapsed since it determined in the above step S101 that the output of the auxiliary DDC 24 was stopped (step S106).

When the determining unit 52 determines in step S106 that the period T12 has not elapsed (step S106: NO), step S102 and subsequent steps are executed. With the process of step S102 to step S105 periodically repeated, the current command value assumes a pulse waveform as indicated in the second graph from the top of FIG. 4, for example.

When the determining unit 52 determines in step S106 that the period T12 has elapsed (step S106: YES), it determines that the solar panels 11, 12 are in a state where power generation is stopped (step S107). In this case, the ECU 50 may stop processing related to control of the solar power generation system 100.

DDC Output Stopped State Detection Process

Figure 3:
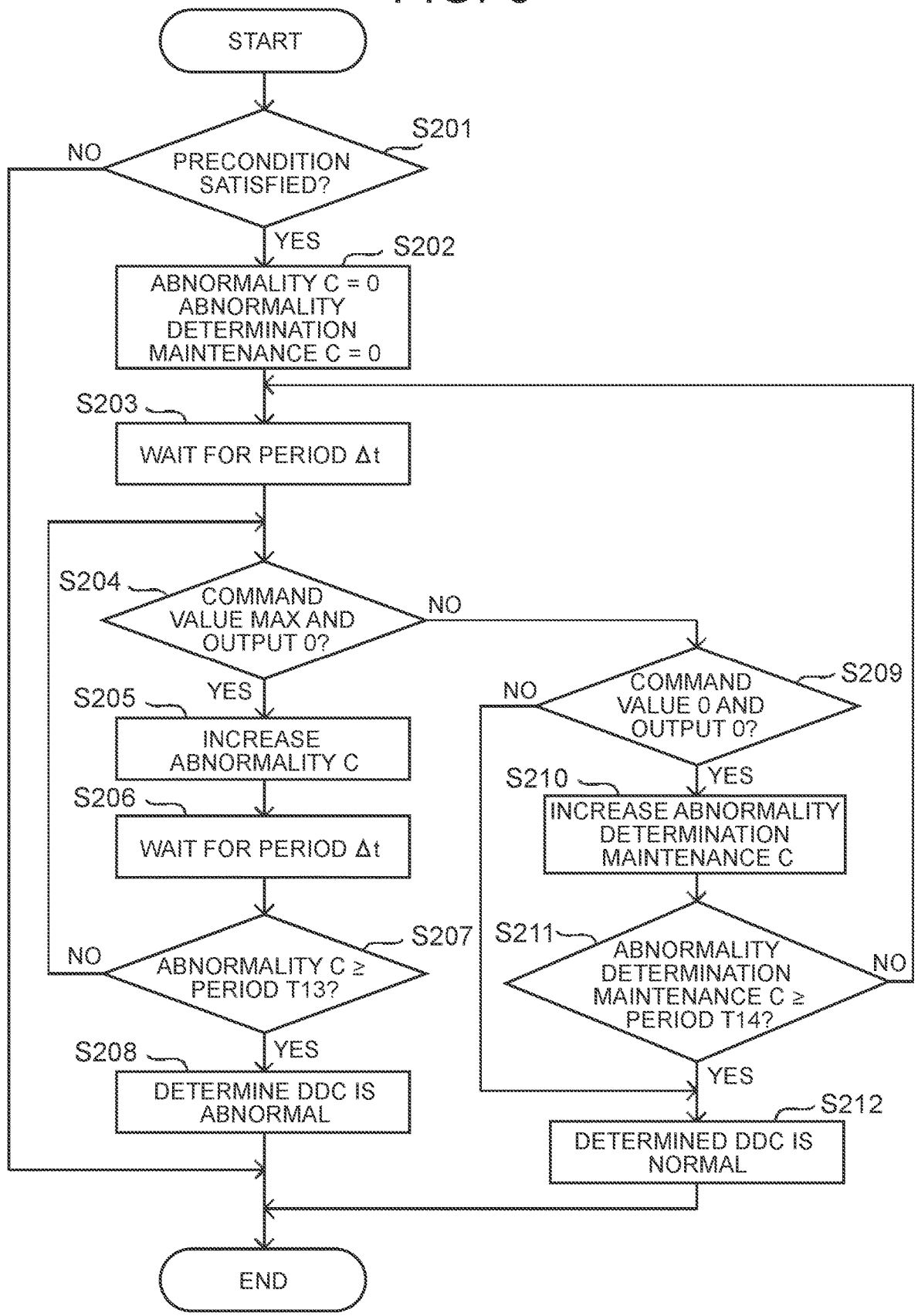
FIG. 3 is a flowchart illustrating a DDC output stopped state detection process according to the first embodiment.

The DDC output stopped state detection process according to the first embodiment will be described with reference to FIG. 3. In FIG. 3, the determining unit 52 of the ECU 50 determines whether a precondition is satisfied (step S201). Here, the precondition is that the determining unit 52 determined in step S101 that the output of the auxiliary DDC 24 was stopped, for example.

When the determining unit 52 determines in step S201 that the precondition is not satisfied (step S201: NO), the process shown in FIG. 3 ends. Then, after a lapse of a second predetermined time, step S201 may be executed. Namely, the process shown in FIG. 3 may be repeatedly performed at intervals of the second predetermined time.

When the determining unit 52 determines in step S201 that the precondition is satisfied (step S201: YES), the setting unit 51 of the ECU 50 sets an abnormality counter (which will be denoted as "abnormality C" when appropriate) to zero, and sets an abnormality determination maintenance counter (which will be denoted as "abnormality determination maintenance C" when appropriate) to zero (step S202). Namely, in step S202, the abnormality C and the abnormality determination maintenance C are initialized.

After execution of step S202, the ECU 50 waits for a period Δt (e.g., eight milliseconds) (step S203). Then, the determining unit 52 determines whether the current command value for the auxiliary DDC 24 is the maximum value, and the output current of the auxiliary DDC 24 is zero (step S204). The state where "the current command value for the auxiliary DDC 24 is the maximum value, and the output current of the auxiliary DDC 24 is zero" will be referred to as "first state" when appropriate. The determining unit 52 may determine that the output current of the auxiliary DDC 24 is zero, when the output current of the auxiliary DDC 24 is equal to or smaller than the above-mentioned threshold current value.

When the determining unit 52 determines in step S204 that the first state is established (step S204: YES), the setting unit 51 increases the value of the abnormality C (step S205). Here, the setting unit 51 increases the abnormality C by one per millisecond, for example. Thus, the value of the abnormality C may be said to represent the elapsed time.

After execution of step S205, the ECU 50 waits for the period Δt (e.g., eight milliseconds) (step S206). During the waiting period, the value of the abnormality C increases with time. Then, the determining unit 52 determines whether the value of the abnormality C is equal to or larger than a period T13 (e.g., 300 milliseconds) (step S207).

When the determining unit 52 determines in step S207 that the value of the abnormality C is not equal to nor larger than the period T13 (step S207: NO), step S204 is executed. At this time, the setting unit 51 stops increasing the value of the abnormality C (however, the value of the abnormality C is maintained). When the determining unit 52 determines in step S207 that the value of the abnormality C is equal to or larger than the period T13 (step S207: YES), the determining unit 52 determines that the auxiliary DDC 24 is abnormal (step S208).

When the determining unit 52 determines in step S204 that the first state is not established (step S204: NO), it determines whether the current command value for the auxiliary DDC 24 is zero, and the output current of the auxiliary DDC 24 is zero (step S209). The state where "the current command value for the auxiliary DDC 24 is zero, and the output current of the auxiliary DDC 24 is zero" will be referred to as "second state" when appropriate. The determining unit 52 may determine that the output current of the auxiliary DDC 24 is zero when the output current of the auxiliary DDC 24 is equal to or smaller than the above-mentioned threshold current value.

When the determining unit 52 determines in step S209 that the second state is not established (step S209: NO), it determines that the auxiliary DDC 24 is normal (step S212). Then, after a lapse of a second predetermined time, step S201 may be executed.

When the determining unit 52 determines in step S209 that the second state is established (step S209: YES), the setting unit 51 increases the value of the abnormality determination maintenance C (step S210). Here, the setting unit 51 increases the abnormality determination maintenance C by one per millisecond, for example. Thus, the value of the abnormality determination maintenance C may be said to represent the elapsed time.

Then, the determining unit 52 determines whether the value of the abnormality determination maintenance C is equal to or larger than a period T14 (e.g., 1000 milliseconds) (step S211). When the determining unit 52 determines in step S211 that the value of the abnormality determination maintenance C is not equal to nor larger than the period T14 (step S211: NO), step S203 is executed. At this time, the setting unit 51 stops increasing the value of the abnormality determination maintenance C (the value of the abnormality determination maintenance C may be initialized).

When the determining unit 52 determines in step S211 that the value of the abnormality determination maintenance C is equal to or larger than the period T14 (step S211: YES), it determines that the auxiliary DDC 24 is normal (step S212). Then, after a lapse of the second predetermined time, step S201 may be executed.

As described above, when the determining unit 52 determines in step S107 (see FIG. 2) that the solar panels 11, 12 are in the power generation stopped state, the ECU 50 may stop processing related to control of the solar power generation system 100. Thus, when it is determined that the solar panels 11, 12 are in the power generation stopped state, the DDC output stopped state detection process shown in FIG. 3 may also be stopped.

Thus, the periods T11, T12, T13, T14, and T15 in FIG. 2 and FIG. 3 are set to satisfy the relationship "T13<T15× T12/(T15+T11)" and the relationship "T11<T14".

In this connection, the period T11 corresponds to the period for which the current command value is zero. The period T12 is a value for determining whether the solar panels 11, 12 are in the power generation stopped state. The period T13 is a value for determining whether the auxiliary DDC 24 is abnormal. The period T14 is a value for determining whether the auxiliary DDC 24 is normal. The period T15 corresponds to the period for which the current command value is the maximum value.

When the relationships indicated above are satisfied, step S208 or step S212 is executed in the DDC output stopped state detection process, before it is determined in the solar power generation stopped state detection process that the solar panels 11, 12 are in the power generation stopped state. Namely, the ECU 50 can properly determine whether the auxiliary DDC 24 is abnormal or normal.

Technical Effect

Figure 4:
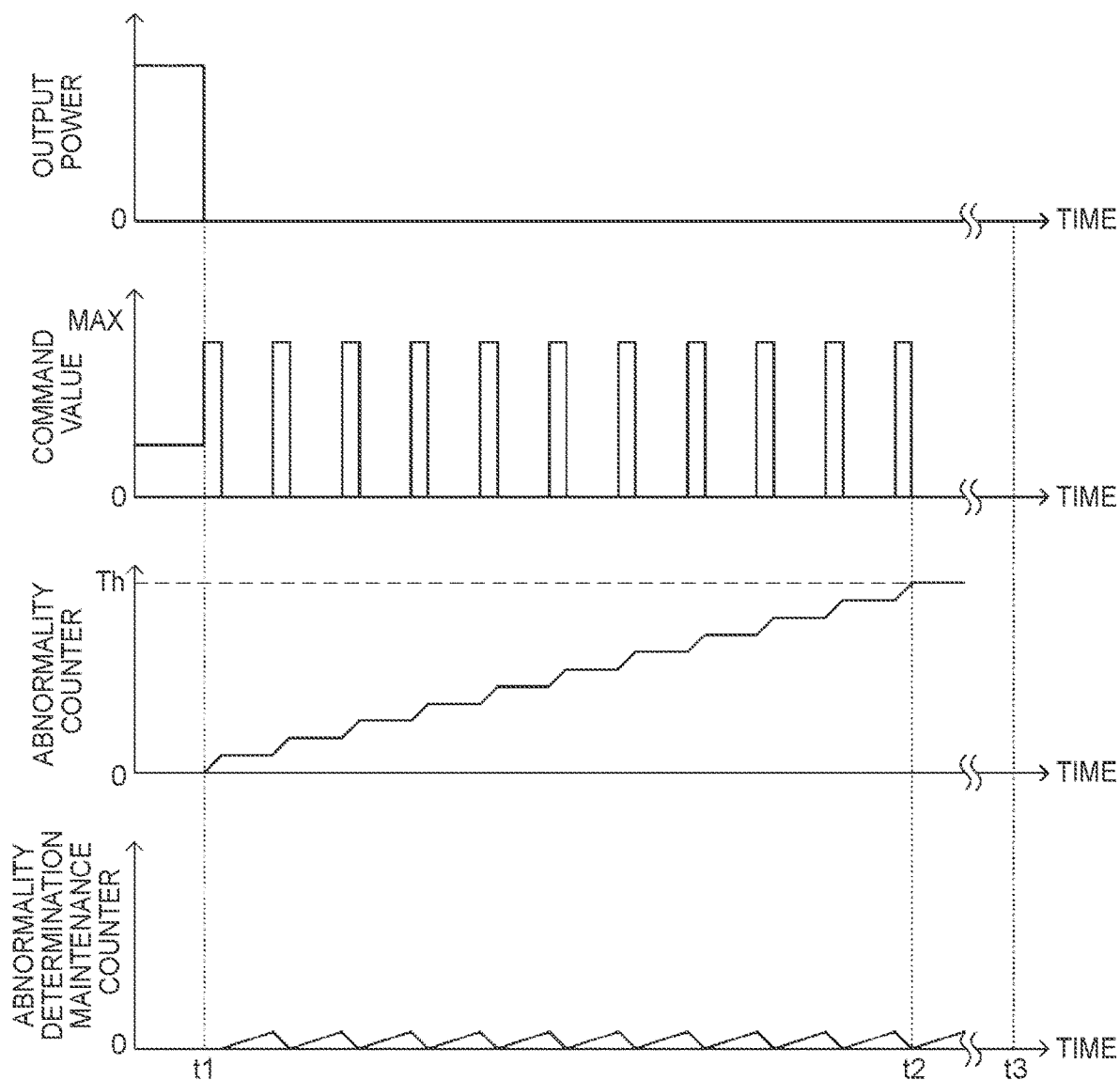
FIG. 4 is a view showing one example of changes in a command value, etc. with time.

An example of changes in the current command value, etc. with time in the case where the ECU 50 determines that the auxiliary DDC 24 is abnormal will be described with reference to FIG. 4. In FIG. 4, it is assumed that the output power of the auxiliary DDC 24 becomes equal to zero (namely, the value of the output current becomes equal to zero) at time t1 (see the uppermost graph). As a result, step S102 of FIG. 2 is executed, so that the current command value for the auxiliary DDC 24 becomes the maximum value (see the second graph from top). At this time, the current command value for the auxiliary DDC 24 is the maximum value, and the output current of the auxiliary DDC 24 is zero; therefore, step S205 of FIG. 3 is executed, so that the value of the abnormality C is increased (see the third graph from top).

Then, step S104 of FIG. 2 is executed, so that the current command value for the auxiliary DDC 24 becomes equal to zero (see the second graph from top). At this time, the current command value for the auxiliary DDC 24 is equal to zero, and the output current of the auxiliary DDC 24 is equal to zero; therefore, step S210 of FIG. 3 is executed, so that the value of the abnormality determination maintenance C is increased (see the lowest graph). During this period, the value of the abnormality C is maintained (see the third graph from top).

From time t1, steps S102 through S105 of FIG. 2 are repeatedly executed until the period T12 elapses. During this period, when the value of the abnormality C reaches a threshold value Th (namely, a value corresponding to the period T13) at time t2, the determining unit 52 determines that the auxiliary DDC 24 is abnormal (see step S208 of FIG. 3). At time t3 when the period T12 elapses from time t1, the determining unit 52 determines that the solar panels 11, 12 are in the power generation stopped state.

According to this embodiment, when the power supply to the auxiliary battery 32 is stopped due to an abnormality in the auxiliary DDC 24, the abnormality in the auxiliary DDC 24 can be detected. Namely, according to this embodiment, an abnormality in a DC/DC converter of the solar power generation system 100 can be detected.

Second Embodiment

A solar control device for controlling the solar power generation system 100 installed in the vehicle 1 according to a second embodiment will be described with reference to FIG. 5 and FIG. 6 in addition to FIG. 1. The second embodiment is substantially the same as the above first embodiment, except that a part of each of the solar power generation stopped state detection process and the DDC output stopped state detection process is different between these embodiments. Accordingly, the differences of the second embodiment from the first embodiment will be mainly described, and description of the second embodiment that overlaps with that of the first embodiment will be omitted as appropriate.

Solar Power Generation Stopped State Detection Process

The solar power generation stopped state detection process according to the second embodiment will be described with reference to the flowchart of FIG. 5. In FIG. 5, the determining unit 52 of the ECU 50 determines whether the output of the auxiliary DDC 24 is stopped, without depending on a command of the ECU 50 (step S301).

Here, the determining unit 52 may determine that the output of the auxiliary DDC 24 is stopped, when the value of the output voltage detected by the sensor 42 is equal to or smaller than a threshold voltage value (e.g., zero). The "threshold voltage value" is a value for determining whether the output of the auxiliary DDC 24 is stopped, and is set in advance as a fixed value or as a variable value that can vary according to some physical quantity or parameter. The relationship between the operating state of the auxiliary DDC 24 and the output voltage value may be obtained empirically, experimentally, or by simulation, for example, and the "threshold voltage value" may be set as the output voltage value at the time when the auxiliary DDC 24 is in an output stopped state, based on the relationship thus obtained.

When the determining unit 52 determines in step S301 that the output of the auxiliary DDC 24 is not stopped (step S301: NO), the process shown in FIG. 5 ends. Then, after a lapse of a third predetermined time, step S301 may be executed. Namely, the process shown in FIG. 5 may be repeatedly performed at intervals of the third predetermined time.

When the determining unit 52 determines in step S301 that the output of the auxiliary DDC 24 is stopped (step S301: YES), the setting unit 51 of the ECU 50 sets the voltage command value for the auxiliary DDC 24 to the maximum value. The instruction unit 53 of the ECU 50 generates the voltage command value set by the setting unit 51 to the auxiliary DDC 24 (step S302). At this time, the setting unit 51 keeps the voltage command value at the maximum value for a period T25 (e.g., 30 milliseconds).

As a result of execution of step S302, overcurrent is detected by the detection circuit 41 (step S303), and, after a lapse of the period T25, the setting unit 51 sets the voltage command value for the auxiliary DDC 24 to zero. The instruction unit 53 generates the voltage command value set by the setting unit 51 to the auxiliary DDC 24 (step S304).

After execution of step S304, the ECU 50 waits for a period T21 (e.g., 100 milliseconds) (step S305). Then, the determining unit 52 determines whether a period T22 (e.g., 3000 milliseconds) has elapsed since it determined in the above step S301 that the output of the auxiliary DDC 24 was stopped (step S306).

When the determining unit 52 determines in step S306 that the period T22 has not elapsed (step S306: NO), step S302 and subsequent steps are executed. When the determining unit 52 determines in step S306 that the period T22 has elapsed (step S306: YES), it determines that the solar panels 11, 12 are in the power generation stopped state (step S307). In this case, the ECU 50 may stop processing related to control of the solar power generation system 100.

DDC Output Stopped State Detection Process

The DDC output stopped state detection process according to the second embodiment will be described with reference to FIG. 6. In FIG. 6, the determining unit 52 of the ECU 50 determines whether a precondition is satisfied (step S401). Here, the precondition is that the determining unit 52 determined in step S301 that the output of the auxiliary DDC 24 was stopped, for example.

When the determining unit 52 determines in step S401 that the precondition is not satisfied (step S401: NO), the process shown in FIG. 6 ends. Then, after a lapse of a fourth predetermined time, step S401 may be executed. Namely, the process shown in FIG. 6 may be repeatedly performed at intervals of the fourth predetermined time.

When the determining unit 52 determines in step S401 that the precondition is satisfied (step S401: YES), the setting unit 51 of the ECU 50 sets the abnormality C to zero, and sets the abnormality determination maintenance C to zero (step S402). Namely, in step S402, the abnormality C and the abnormality determination maintenance C are initialized.

After execution of step S402, the ECU 50 waits for a period Δt (e.g., eight milliseconds) (step S403). Then, the determining unit 52 determines whether the voltage command value for the auxiliary DDC 24 is the maximum value, and the output voltage of the auxiliary DDC 24 is zero (step S404). The state where "the voltage command value for the auxiliary DDC 24 is the maximum value, and the output voltage of the auxiliary DDC 24 is zero" will be referred to as "third state" when appropriate. The determining unit 52 may determine that the output voltage of the auxiliary DDC 24 is zero, when the output voltage of the auxiliary DDC 24 is equal to or smaller than the above-mentioned threshold voltage value.

When the determining unit 52 determines in step S404 that the third state is established (step S404: YES), the setting unit 51 increases the value of the abnormality C (step S405). Here, the setting unit 51 increases the abnormality C by one per millisecond, for example. Thus, the value of the abnormality C is said to represent the elapsed time.

After execution of step S405, the ECU 50 waits for the period Δt (e.g., eight milliseconds) (step S406). During the waiting period, the value of the abnormality C increases with time. Then, the determining unit 52 determines whether the value of the abnormality C is equal to or larger than a period T23 (e.g., 300 milliseconds) (step S407).

When the determining unit 52 determines in step S407 that the value of the abnormality C is not equal to nor larger than the period T23 (step S407: NO), step S404 is executed. At this time, the setting unit 51 stops increasing the value of the abnormality C (however, the value of the abnormality C is maintained). When the determining unit 52 determines in step S407 that the value of the abnormality C is equal to or larger than the period T23 (step S407: YES), it determines that the auxiliary DDC 24 is abnormal (step S408).

When the determining unit 52 determines in step S404 that the third state is not established (step S404: NO), it determines whether the voltage command value for the auxiliary DDC 24 is zero, and the output voltage of the auxiliary DDC 24 is zero (step S409). The state where "the voltage command value for the auxiliary DDC 24 is zero, and the output voltage of the auxiliary DDC 24 is zero" will be referred to as "fourth state" when appropriate. The determining unit 52 may determine that the output voltage of the auxiliary DDC 24 is zero when the output voltage of the auxiliary DDC 24 is equal to or smaller than the above-mentioned threshold voltage value.

When the determining unit 52 determines in step S409 that the fourth state is not established (step S409: NO), it determines that the auxiliary DDC 24 is normal (step S412). Then, after a lapse of the fourth predetermined time, step S401 may be executed.

When the determining unit 52 determines in step S409 that the fourth state is established (step S409: YES), the setting unit 51 increases the value of the abnormality determination maintenance C (step S410). Here, the setting unit 51 increases the abnormality determination maintenance C by one per millisecond, for example. Thus, the value of the abnormality determination maintenance C is said to represent the elapsed time.

Then, the determining unit 52 determines whether the value of the abnormality determination maintenance C is equal to or larger than a period T24 (e.g., 1000 milliseconds) (step S411). When the determining unit 52 determines in step S411 that the value of the abnormality determination maintenance C is not equal to nor larger than the period T24 (step S411: NO), step S403 is executed. At this time, the setting unit 51 stops increasing the value of the abnormality determination maintenance C (the value of the abnormality determination maintenance C may be initialized).

When the determining unit 52 determines in step S411 that the value of the abnormality determination maintenance C is equal to or larger than the period T24 (step S411: YES), the determining unit 52 determines that the auxiliary DDC 24 is normal (step S412). Then, after a lapse of the fourth predetermined time, step S401 may be executed.

As described above, when it is determined in step S307 (see FIG. 5) that the solar panels 11, 12 are in the power generation stopped state, the ECU 50 may stop processing related to control of the solar power generation system 100. Thus, when it is determined that the solar panels 11, 12 are in the power generation stopped state, the DDC output stopped state detection process shown in FIG. 6 may also be stopped.

Figure 5:
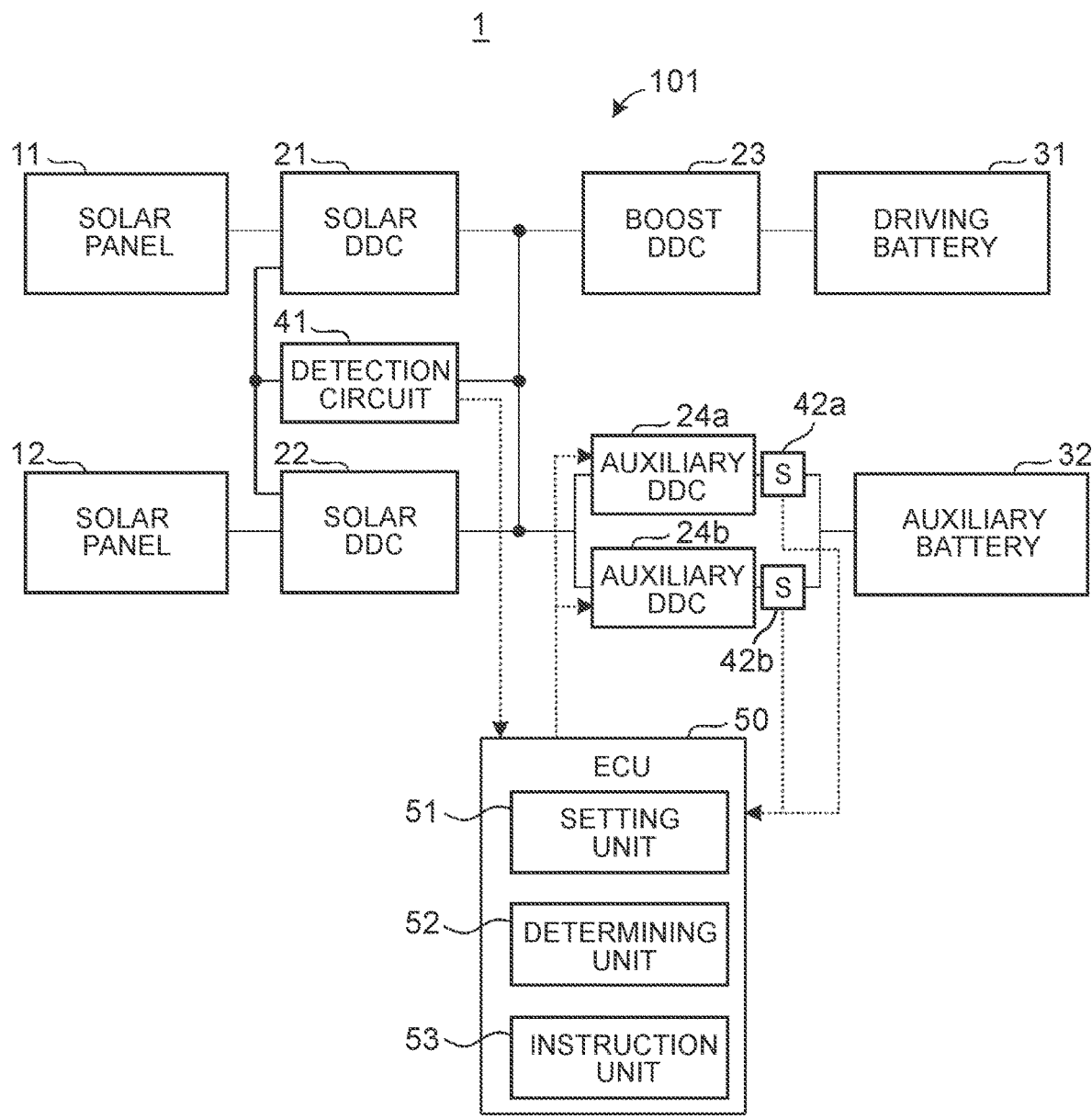
FIG. 5 is a view showing the configuration of a solar power generation system according to a modified example of the first embodiment.
Figure 6:
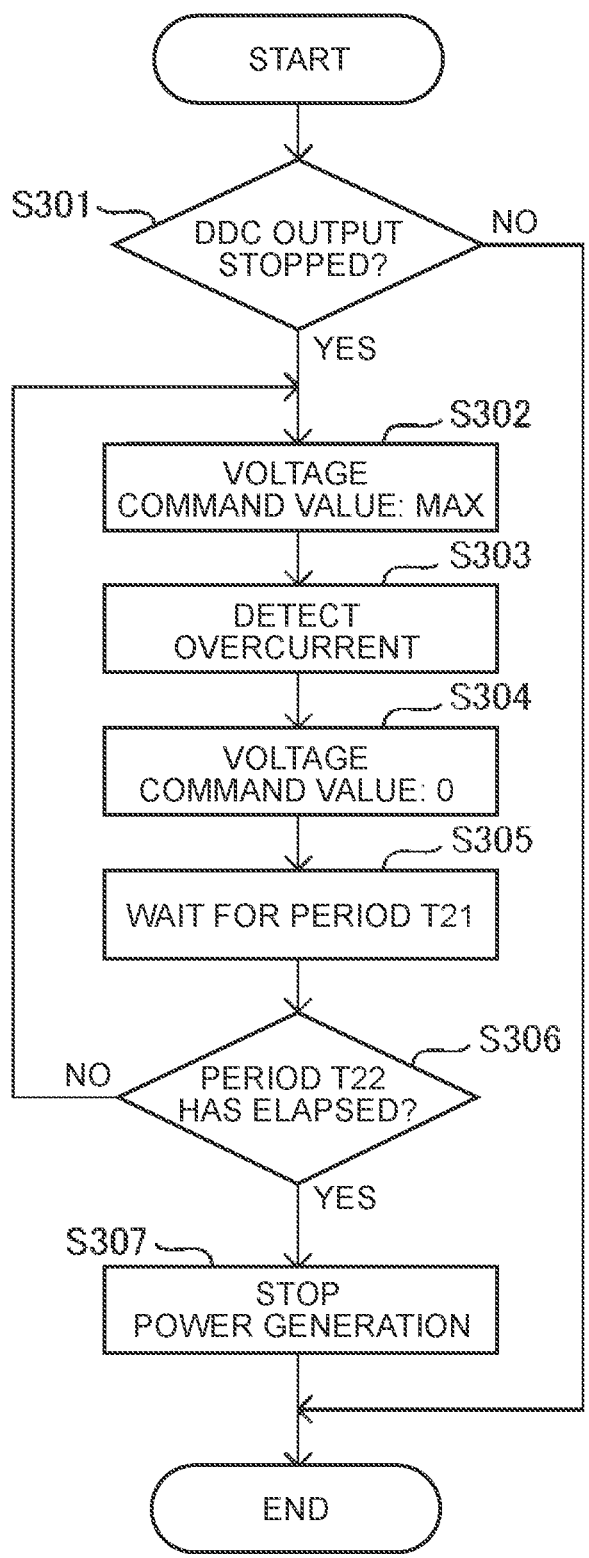
FIG. 6 is a flowchart illustrating a solar power generation stopped state detection process according to a second embodiment.
Figure 8A:
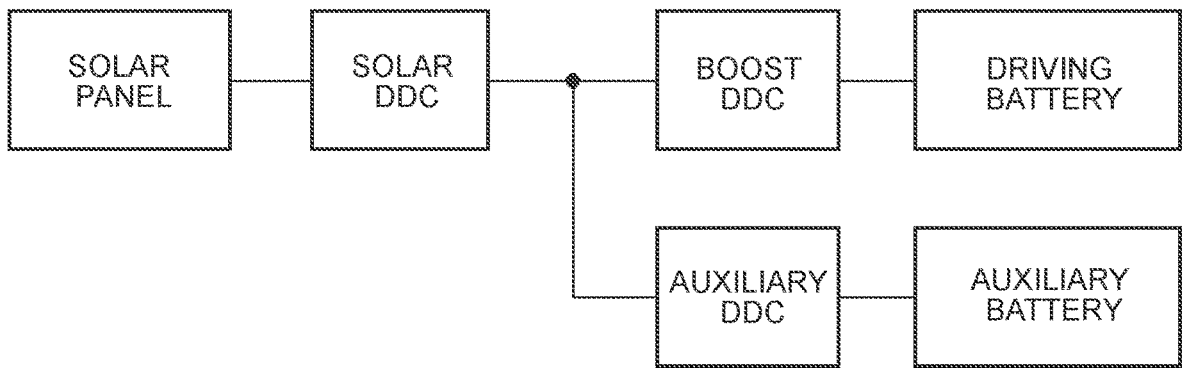
FIG. 8A is a view showing a modified example of the solar power generation system.
Figure 8B:
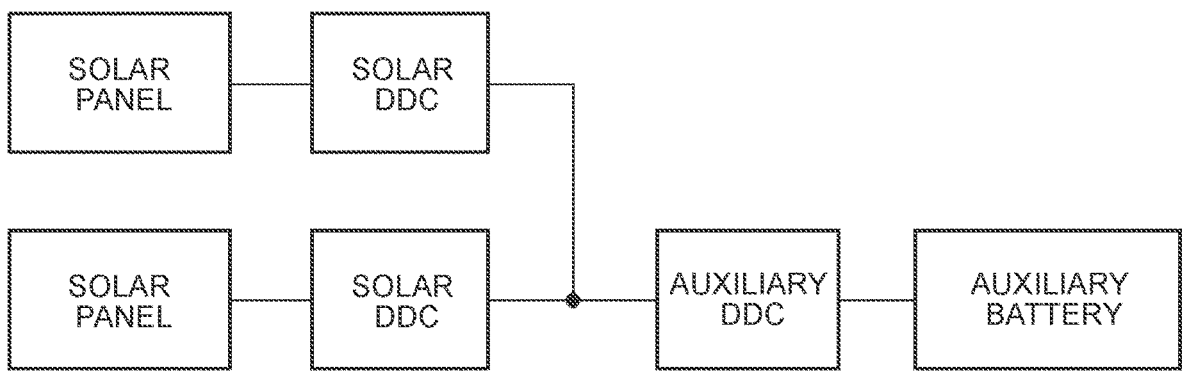
FIG. 8B is a view showing another modified example of the solar power generation system.
Figure 8C:
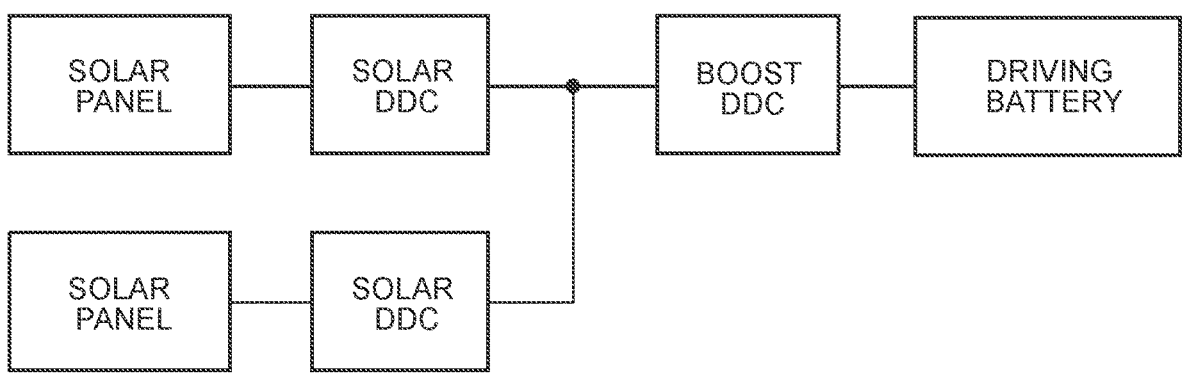
FIG. 8C is a view showing a further modified example of the solar power generation system.

Thus, the periods T21, T22, T23, T24, and T25 in FIG. 5 and FIG. 6 are set to satisfy the relationship "T23<T25× T22/(T25+T21)" and the relationship "T21<T24".

In this connection, the period T21 corresponds to the period for which the voltage command value is zero. The period T22 is a value for determining whether the solar panels 11, 12 are in the power generation stopped state. The period T23 is a value for determining whether the auxiliary DDC 24 is abnormal. The period T24 is a value for determining whether the auxiliary DDC 24 is normal. The period T25 corresponds to the period for which the voltage command value is the maximum value.

When the relationships indicated above are satisfied, step S408 or step S412 is executed in the DDC output stopped state detection process, before it is determined in the solar power generation stopped state detection process that the solar panels 11, 12 are in the power generation stopped state. Namely, the ECU 50 can properly determine whether the auxiliary DDC 24 is abnormal or normal.

Technical Effect

According to this embodiment, when the power supply to the auxiliary battery 32 is stopped due to an abnormality in the auxiliary DDC 24, the abnormality in the auxiliary DDC 24 can be detected, as in the first embodiment.

Third Embodiment

A solar control device for controlling the solar power generation system 100 installed in the vehicle 1 according to a third embodiment will be described. The third embodiment is different from the first embodiment in that an abnormality in the boost DDC 23 (see FIG. 1) is detected in the third embodiment, whereas an abnormality in the auxiliary DDC 24 is detected in the first embodiment. Other than this point, the third embodiment is the same as the above first embodiment. Accordingly, the differences of the third embodiment from the first embodiment will be mainly described, and description of the third embodiment that overlaps with that of the first embodiment will be omitted as appropriate.

Solar Power Generation Stopped State Detection Process

The solar power generation stopped state detection process according to the third embodiment will be described with reference to the flowchart of FIG. 2. In FIG. 2, the determining unit 52 of the ECU 50 determines whether the output of the boost DDC 23 is stopped, without depending on a command of the ECU 50 (step S101).

Here, the determining unit 52 may determine that output of the boost DDC 23 is stopped, when the value of the output current of the boost DDC 23 is equal to or smaller than a threshold current value (e.g., zero). The "threshold current value" is a value for determining whether output of the boost DDC 23 is stopped, and is set in advance as a fixed value or as a variable value that can vary according to some physical quantity or parameter. The relationship between the operating state of the boost DDC 23 and the output current value may be obtained empirically, experimentally, or by simulation, for example, and the "threshold current value" may be set as the output current value at the time when the boost DDC 23 is in an output stopped state, based on the relationship thus obtained.

When the determining unit 52 determines in step S101 that the output of the boost DDC 23 is not stopped (NO in step S101), the process shown in FIG. 2 ends.

When the determining unit 52 determines in step S101 that the output of the boost DDC 23 is stopped (YES in step S101), the setting unit 51 of the ECU 50 sets the current command value for the boost DDC 23 to the maximum value. The instruction unit 53 of the ECU 50 generates the current command value set by the setting unit 51, to the boost DDC 23 (step S102). At this time, the setting unit 51 keeps the current command value at the maximum value for a period T15 (e.g., 30 milliseconds).

As a result of execution of step S102, overvoltage is detected by the detection circuit 41 (step S103), and the setting unit 51 sets the current command value for the boost DDC 23 to zero after a lapse of the above period T15. The instruction unit 53 generates the current command value set by the setting unit 51 to the boost DDC 23 (step S104).

After execution of step S104, the ECU 50 waits for a period T11 (e.g., 100 milliseconds) (step S105). Then, the determining unit 52 determines whether a period T12 (e.g., 3000 milliseconds) has elapsed since it determined in the above step S101 that the output of the boost DDC 23 was stopped (step S106).

When the determining unit 52 determines in step S106 that the period T12 has not elapsed (step S106: NO), step S102 and subsequent steps are executed. When the determining unit 52 determines in step S106 that the period T12 has elapsed (step S106: YES), it determines that the solar panels 11, 12 are in the power generation stopped state (step S107). In this case, the ECU 50 may stop processing related to control of the solar power generation system 100.

DDC Output Stopped State Detection Process

The DDC output stopped state detection process according to the third embodiment will be described with reference to FIG. 3. In FIG. 3, the determining unit 52 of the ECU 50 determines whether a precondition is satisfied (step S201). Here, the precondition is that the determining unit 52 determined in step S101 that the output of the boost DDC 23 was stopped, for example.

When the determining unit 52 determines in step S201 that the precondition is not satisfied (step S201: NO), the process shown in FIG. 3 ends. When the determining unit 52 determines in step S201 that the precondition is satisfied (step S201: YES), the setting unit 51 of the ECU 50 sets the abnormality C to zero, and sets the abnormality determination maintenance C to zero (step S202). Namely, in step S202, the abnormality C and the abnormality determination maintenance C are initialized.

After execution of step S202, the ECU 50 waits for a period Δt (e.g., eight milliseconds) (step S203). Then, the determining unit 52 determines whether the current command value for the boost DDC 23 is the maximum value, and the output current of the boost DDC 23 is zero (step S204). The state where "the current command value for the boost DDC 23 is the maximum value, and the output current of the boost DDC 23 is zero" will be referred to as "fifth state" when appropriate. The determining unit 52 may determine that the output current of the boost DDC 23 is zero, when the output current of the boost DDC 23 is equal to or smaller than the above-mentioned threshold current value.

When the determining unit 52 determines in step S204 that the fifth state is established (step S204: YES), the setting unit 51 increases the value of the abnormality C (step S205). Here, the setting unit 51 increases the abnormality C by one per millisecond, for example. Thus, the value of the abnormality C is said to represent the elapsed time.

After execution of step S205, the ECU 50 waits for the period Δt (e.g., eight milliseconds) (step S206). During the waiting period, the value of the abnormality C increases with time. Then, the determining unit 52 determines whether the value of the abnormality C is equal to or larger than a period T13 (e.g., 300 milliseconds) (step S207).

When the determining unit 52 determines in step S207 that the value of the abnormality C is not equal to nor larger than the period T13 (step S207: NO), step S204 is executed. At this time, the setting unit 51 stops increasing the value of the abnormality C (however, the value of the abnormality C is maintained). When the determining unit 52 determines in step S207 that the value of the abnormality C is equal to or larger than the period T13 (step S207: YES), the determining unit 52 determines that the boost DDC 23 is abnormal (step S208).

When the determining unit 52 determines in step S204 that the fifth state is not established (step S204: NO), it determines whether the current command value for the boost DDC 23 is zero, and the output current of the boost DDC 23 is zero (step S209). The state where "the current command value for the boost DDC 23 is zero, and the output current of the boost DDC 23 is zero" will be referred to as "sixth state" when appropriate. The determining unit 52 may determine that the output current of the boost DDC 23 is zero when the output current of the boost DDC 23 is equal to or smaller than the above-mentioned threshold current value.

When the determining unit 52 determines in step S209 that the sixth state is not established (step S209: NO), it determines that the boost DDC 23 is normal (step S212). When the determining unit 52 determines in step S209 that the sixth state is established (step S209: YES), the setting unit 51 increases the value of the abnormality determination maintenance C (step S210). Here, the setting unit 51 increases the abnormality determination maintenance C by one per millisecond, for example. Thus, the value of the abnormality determination maintenance C is said to represent the elapsed time.

Then, the determining unit 52 determines whether the value of the abnormality determination maintenance C is equal to or larger than a period T14 (e.g., 1000 milliseconds) (step S211). When the determining unit 52 determines in step S211 that the value of the abnormality determination maintenance C is not equal to nor larger than the period T14 (step S211: NO), step S203 is executed. At this time, the setting unit 51 stops increasing the value of the abnormality determination maintenance C (the value of the abnormality determination maintenance C may be initialized).

When the determining unit 52 determines in step S211 that the value of the abnormality determination maintenance C is equal to or larger than the period T14 (step S211: YES), the determining unit 52 determines that the boost DDC 23 is normal (step S212).

Here, the periods T11, T12, T13, T14, and T15 in FIG. 2 and FIG. 3 are set to satisfy the relationship "T13<T15× T12/(T15+T11)" and the relationship "T11<T14".

In this connection, the period T11 corresponds to the period for which the current command value is zero. The period T12 is a value for determining whether the solar panels 11, 12 are in the power generation stopped state. The period T13 is a value for determining whether the boost DDC 23 is abnormal. The period T14 is a value for determining whether the boost DDC 23 is normal. The period T15 corresponds to the period for which the current command value is the maximum value.

When the relationships indicated above are satisfied, step S208 or step S212 is executed in the DDC output stopped state detection process, before it is determined in the solar power generation stopped state detection process that the solar panels 11, 12 are in the power generation stopped state. Namely, the ECU 50 can properly determine whether the boost DDC 23 is abnormal or normal.

Fourth Embodiment

A solar control device for controlling the solar power generation system 100 installed in the vehicle 1 according to a fourth embodiment will be described. The fourth embodiment is different from the first and second embodiments in that an abnormality in the boost DDC 23 (see FIG. 1) is detected in the fourth embodiment, whereas an abnormality in the auxiliary DDC 24 is detected in the first and second embodiments. Other than this point, the fourth embodiment is the same as the first and second embodiments described above. Accordingly, the differences of the fourth embodiment from the first and second embodiments will be mainly described, and description of the fourth embodiment that overlaps with that of the first and second embodiments will be omitted as appropriate.

Solar Power Generation Stopped State Detection Process

The solar power generation stopped state detection process according to the fourth embodiment will be described with reference to the flowchart of FIG. 5. In FIG. 5, the determining unit 52 of the ECU 50 determines whether the output of the boost DDC 23 is stopped, without depending on a command of the ECU 50 (step S301).

Here, the determining unit 52 may determine that output of the boost DDC 23 is stopped, when the value of the output voltage of the boost DDC 23 is equal to or smaller than a threshold voltage value (e.g., zero). The "threshold voltage value" is a value for determining whether the output of the boost DDC 23 is stopped, and is set in advance as a fixed value or as a variable value that can vary according to some physical quantity or parameter. The relationship between the operating state of the boost DDC 23 and the output voltage value may be obtained empirically, experimentally, or by simulation, for example, and the "threshold voltage value" may be set as the output voltage value at the time when the boost DDC 23 is in an output stopped state, based on the relationship thus obtained.

When the determining unit 52 determines in step S301 that the output of the boost DDC 23 is not stopped (NO in step S301), the process shown in FIG. 5 ends. When the determining unit 52 determines in step S301 that the output of the boost DDC 23 is stopped (YES in step S301), the setting unit 51 of the ECU 50 sets the voltage command value for the boost DDC 23 to the maximum value. The instruction unit 53 of the ECU 50 generates the voltage command value set by the setting unit 51, to the boost DDC 23 (step S302). At this time, the setting unit 51 keeps the voltage command value at the maximum value for a period T25 (e.g., 30 milliseconds).

As a result of execution of step S302, overcurrent is detected by the detection circuit 41 (step S303), and the setting unit 51 sets the voltage command value for the boost DDC 23 to zero after a lapse of the above period T25. The instruction unit 53 generates the voltage command value set by the setting unit 51 to the boost DDC 23 (step S304).

After execution of step S304, the ECU 50 waits for a period T21 (e.g., 100 milliseconds) (step S305). Then, the determining unit 52 determines whether a period T22 (e.g., 3000 milliseconds) has elapsed since it determined in the above step S301 that the output of the boost DDC 23 was stopped (step S306).

When the determining unit 52 determines in step S306 that the period T22 has not elapsed (step S306: NO), step S302 and subsequent steps are executed. When the determining unit 52 determines in step S306 that the period T22 has elapsed (step S306: YES), it determines that the solar panels 11, 12 are in the power generation stopped state (step S307). In this case, the ECU 50 may stop processing related to control of the solar power generation system 100.

DDC Output Stopped State Detection Process

The DDC output stopped state detection process according to the fourth embodiment will be described with reference to FIG. 6. In FIG. 6, the determining unit 52 of the ECU 50 determines whether a precondition is satisfied (step S401). Here, the precondition is that the determining unit 52 determined in step S301 that the output of the boost DDC 23 was stopped, for example.

When the determining unit 52 determines in step S401 that the precondition is not satisfied (step S401: NO), the process shown in FIG. 6 ends. When the determining unit 52 determines in step S401 that the precondition is satisfied (step S401: YES), the setting unit 51 of the ECU 50 sets the abnormality C to zero, and sets the abnormality determination maintenance C to zero (step S402). Namely, in step S402, the abnormality C and the abnormality determination maintenance C are initialized.

After execution of step S402, the ECU 50 waits for a period Δt (e.g., eight milliseconds) (step S403). Then, the determining unit 52 determines whether the voltage command value for the boost DDC 23 is the maximum value, and the output voltage of the boost DDC 23 is zero (step S404). The state where "the voltage command value for the boost DDC 23 is the maximum value, and the output voltage of the boost DDC 23 is zero" will be referred to as "seventh state" when appropriate. The determining unit 52 may determine that the output voltage of the boost DDC 23 is zero, when the output voltage of the boost DDC 23 is equal to or lower than the above-mentioned threshold voltage value.

When the determining unit 52 determines in step S404 that the seventh state is established (step S404: YES), the setting unit 51 increases the value of the abnormality C (step S405). Here, the setting unit 51 increases the abnormality C by one per millisecond, for example. Thus, the value of the abnormality C is said to represent the elapsed time.

After execution of step S405, the ECU 50 waits for the period Δt (e.g., eight milliseconds) (step S406). During the waiting period, the value of the abnormality C increases with time. Then, the determining unit 52 determines whether the value of the abnormality C is equal to or larger than a period T23 (e.g., 300 milliseconds) (step S407).

When the determining unit 52 determines in step S407 that the value of the abnormality C is not equal to nor larger than the period T23 (step S407: NO), step S404 is executed. At this time, the setting unit 51 stops increasing the value of the abnormality C (however, the value of the abnormality C is maintained). When the determining unit 52 determines in step S407 that the value of the abnormality C is equal to or larger than the period T23 (step S407: YES), the determining unit 52 determines that the boost DDC 23 is abnormal (step S408).

When the determining unit 52 determines in step S404 that the seventh state is not established (step S404: NO), it determines whether the voltage command value for the boost DDC 23 is zero, and the output voltage of the boost DDC 23 is zero (step S409). The state where "the voltage command value for the boost DDC 23 is zero, and the output voltage of the boost DDC 23 is zero" will be referred to as "eighth state" when appropriate. The determining unit 52 may determine that the output voltage of the boost DDC 23 is zero when the output voltage of the boost DDC 23 is equal to or smaller than the above-mentioned threshold voltage value.

When the determining unit 52 determines in step S409 that the eighth state is not established (step S409: NO), it determines that the boost DDC 23 is normal (step S412). When the determining unit 52 determines in step S409 that the eighth state is established (step S409: YES), the setting unit 51 increases the value of the abnormality determination maintenance C (step S410). Here, the setting unit 51 increases the abnormality determination maintenance C by one per millisecond, for example. Thus, the value of the abnormality determination maintenance C is said to represent the elapsed time.

Then, the determining unit 52 determines whether the value of the abnormality determination maintenance C is equal to or larger than a period T24 (e.g., 1000 milliseconds) (step S411). When the determining unit 52 determines in step S411 that the value of the abnormality determination maintenance C is not equal to nor greater than the period T24 (step S411: NO), step S403 is executed. At this time, the setting unit 51 stops increasing the value of the abnormality determination maintenance C (the value of the abnormality determination maintenance C may be initialized).

When the determining unit 52 determines in step S411 that the value of the abnormality determination maintenance C is equal to or larger than the period T24 (step S411: YES), it determines that the boost DDC 23 is normal (step S412).

Here, the periods T21, T22, T23, T24, and T25 in FIG. 5 and FIG. 6 are set to satisfy the relationship "T23<T25× T22/(T25+T21)" and the relationship "T21<T24".

In this connection, the period T21 corresponds to the period for which the voltage command value is zero. The period T22 is a value for determining whether the solar panels 11, 12 are in the power generation stopped state. The period T23 is a value for determining whether the boost DDC 23 is abnormal. The period T24 is a value for determining whether the boost DDC 23 is normal. The period T25 corresponds to the period for which the voltage command value is the maximum value.

When the relationships indicated above are satisfied, step S408 or step S412 is executed in the DDC output stopped state detection process, before it is determined in the solar power generation stopped state detection process that the solar panels 11, 12 are in the power generation stopped state. Namely, the ECU 50 can properly determine whether the boost DDC 23 is abnormal or normal.

The solar power generation stopped state detection process and DDC output stopped state detection process as described above are also applicable to a solar power generation system in which electric power generated by a single solar panel can be supplied to a driving battery and an auxiliary battery, as shown in FIG. 7A. In this case, too, it is possible to properly determine an abnormality in at least one of the auxiliary DDC and boost DDC.

The solar power generation stopped state detection process and DDC output stopped state detection process as described above are also applicable to a solar power generation system in which electric power generated by two solar panels can be supplied to an auxiliary battery, as shown in FIG. 7B. In this case, too, it is possible to properly determine an abnormality in the auxiliary DDC.

The solar power generation stopped state detection process and DDC output stopped state detection process as described above are also applicable to a solar power generation system in which electric power generated by two solar panels can be supplied to a driving battery, as shown in FIG. 7C. In this case, too, it is possible to properly determine an abnormality in the boost DDC.

Various aspects of the present disclosure derived from the illustrated embodiments and modified examples will be described below.

A solar control device according to one aspect of the present disclosure controls a solar power generation system having at least one first group including a solar panel and a first DC/DC converter and at least one second group including a second DC/DC converter and a battery. At least one of the at least one first group and the at least one second group is a plurality of the first groups or the second groups. The first DC/DC converter is configured to output electric power generated by the solar panel to a first power line, and the second DC/DC converter is configured to output electric power received via the first power line, to a second power line. The battery is connected to the second power line. The solar control device includes an electronic control unit configured to set an output command value for the second DC/DC converter such that the output command value periodically switches between a first value and a second value that is smaller than the first value, when an output of the second DC/DC converter is equal to or smaller than a threshold value, and determine that the second DC/DC converter is abnormal when the output command value and the output of the second DC/DC converter satisfy a predetermined condition.

In the illustrated embodiments, the "solar DDC 21" and "solar DDC 22" correspond to examples of the "first DC/DC converter", and the "boost DDC 23" and "auxiliary DDC 24" correspond to examples of the "second DC/DC converter". The "driving battery 31" and "auxiliary battery 32" correspond to examples of the "battery", and the "ECU 50" corresponds to one example of the "electronic control unit".

In FIG. 1, the power line that connects each of the "solar DDC 21" and "solar DDC 22" with the "boost DDC 23" and "auxiliary DDC 24" corresponds to the "first power line". In FIG. 1, the power line that connects the "boost DDC 23" with the "driving battery 31" and the power line that connects the "auxiliary DDC 24" with the "auxiliary battery 32" correspond to examples of the "second power line". The "maximum value of the current demand value" and the "maximum value of the voltage command value" correspond to examples of the "first value". The "current command value equal to zero" and the "voltage command value equal to zero" correspond to examples of the "second value".

In the solar control device, the predetermined condition may include a condition that a period for which the output command value is the first value and the output of the second DC/DC converter is equal to or smaller than the threshold value is equal to or greater than a first predetermined period.

In the illustrated embodiments, the "period T13" and "period T23" correspond to examples of the "first predetermined period".

In the solar control device, the electronic control unit may be configured to keep the output command value at the first value for a second predetermined period after switching the output command value from the second value to the first value, keep the output command value at the second value for a third predetermined period after switching the output command value from the first value to the second value, and determine that power generation by the solar panel is stopped, when a fourth predetermined period has elapsed since the output of the second DC/DC converter became equal to or smaller than the threshold value.

In the illustrated embodiments, the "period T15" and "period T25" correspond to examples of the "second predetermined period", and the "period T11" and "period T21" correspond to examples of the "third predetermined period". The "period T12" and "period T22" correspond to examples of the "fourth predetermined period".

In the solar control device, the first predetermined period, the second predetermined period, the third predetermined period, and the fourth predetermined period may satisfy a relationship that (the first predetermined period)<(the second predetermined period)×(the fourth predetermined period)/{(the second predetermined period)+(the third predetermined period)}.

In the solar control device, the electronic control unit may be configured to (i) count a period for which a first state in which the output command value is the first value and the output of the second DC/DC converter is equal to or smaller than the threshold value is established, and (ii) maintain the counted period when a second state in which the output command value is the second value and the output of the second DC/DC converter is equal to or smaller than the threshold value is established.

In the illustrated embodiments, the "first state", "third state", "fifth state", and "seventh state" correspond to examples of the "first state", and the "second state", "fourth state", "sixth state", and "eighth state" correspond to examples of the "second state".

A solar control method according to another aspect of the present disclosure is a method of controlling a solar power generation system having at least one first group including a solar panel and a first DC/DC converter and at least one second group including a second DC/DC converter and a battery, using an electronic control unit. At least one of the at least one first group and the at least one second group is a plurality of the first groups or the second groups. The first DC/DC converter is configured to output electric power generated by the solar panel to a first power line, and the second DC/DC converter is configured to output electric power received via the first power line, to a second power line. The battery is connected to the second power line. The solar control method includes setting an output command value for the second DC/DC converter by the electronic control unit such that the output command value periodically switches between a first value and a second value that is smaller than the first value, when an output of the second DC/DC converter is equal to or smaller than a threshold value, and determining by the electronic control unit that the second DC/DC converter is abnormal when the output command value and the output of the second DC/DC converter satisfy a predetermined condition.

A vehicle according to a further aspect of the present disclosure includes a solar power generation system, and a solar control device configured to control the solar power generation system. The solar power generation system has at least one first group including a solar panel and a first DC/DC converter and at least one second group including a second DC/DC converter and a battery. At least one of the at least one first group and the at least one second group is a plurality of the first groups or the second groups. The first DC/DC converter is configured to output electric power generated by the solar panel to a first power line, and the second DC/DC converter is configured to output electric power received via the first power line, to a second power line. The battery is connected to the second power line. The solar control device includes an electronic control unit configured to set an output command value for the second DC/DC converter such that the output command value periodically switches between a first value and a second value that is smaller than the first value, when an output of the second DC/DC converter is equal to or smaller than a threshold value, and determine that the second DC/DC converter is abnormal when the output command value and the output of the second DC/DC converter satisfy a predetermined condition.

In the vehicle, the predetermined condition may include a condition that a period for which the output command value is the first value and the output of the second DC/DC converter is equal to or smaller than the threshold value is equal to or greater than a first predetermined period.

In the vehicle, the electronic control unit may be configured to keep the output command value at the first value for a second predetermined period after switching the output command value from the second value to the first value, keep the output command value at the second value for a third predetermined period after switching the output command value from the first value to the second value, and determine that power generation by the solar panel is stopped, when a fourth predetermined period has elapsed since the output of the second DC/DC converter became equal to or smaller than the threshold value.

In the vehicle, the first predetermined period, the second predetermined period, the third predetermined period, and the fourth predetermined period may satisfy a relationship that (the first predetermined period)<(the second predetermined period)×(the fourth predetermined period)/{(the second predetermined period)+(the third predetermined period)}.

In the vehicle, the electronic control unit may be configured to (i) count a period for which a first state in which the output command value is the first value and the output of the second DC/DC converter is equal to or smaller than the threshold value is established, and (ii) maintain the counted period when a second state in which the output command value is the second value and the output of the second DC/DC converter is equal to or smaller than the threshold value is established.

An applicable embodiment of the present disclosure is not limited to the illustrated embodiments, but the embodiments may be modified as appropriate without contradicting the principle or concept of the present disclosure that can be read from the appended claims and the specification as a whole, and the solar control device and method and vehicle involving such modifications are also included in the technical scope of the present disclosure.

What is claimed is:
1. A solar control device for controlling a solar power generation system, the solar power generation system having at least one first group including a solar panel and a first DC/DC converter and at least one second group including a second DC/DC converter and a battery, at least one of the at least one first group and the at least one second group being a plurality of the first groups or the second groups, the first DC/DC converter being configured to output electric power generated by the solar panel to a first power line, the second DC/DC converter being configured to output electric power received via the first power line, to a second power line, the battery being connected to the second power line, the solar control device comprising
an electronic control unit configured to:
set an output command value for the second DC/DC converter such that the output command value periodically switches between a first value and a second value that is smaller than the first value, when an output of the second DC/DC converter is equal to or smaller than a threshold value; and
determine that the second DC/DC converter is abnormal when the output command value and the output of the second DC/DC converter satisfy a predetermined condition.

2. The solar control device according to claim 1, wherein the predetermined condition comprises a condition that a period for which the output command value is the first value and the output of the second DC/DC converter is equal to or smaller than the threshold value is equal to or greater than a first predetermined period.

3. The solar control device according to claim 2, wherein:
the electronic control unit is configured to keep the output command value at the first value for a second predetermined period after switching the output command value from the second value to the first value;
the electronic control unit is configured to keep the output command value at the second value for a third predetermined period after switching the output command value from the first value to the second value; and
the electronic control unit is configured to determine that power generation by the solar panel is stopped, when a fourth predetermined period has elapsed since the output of the second DC/DC converter became equal to or smaller than the threshold value.

4. The solar control device according to claim 3, wherein the first predetermined period, the second predetermined period, the third predetermined period, and the fourth predetermined period satisfy a relationship that (the first predetermined period)<(the second predetermined period)×(the fourth predetermined period)/{(the second predetermined period)+(the third predetermined period)}.

5. The solar control device according to claim 1, wherein:
the electronic control unit is configured to count a period for which a first state in which the output command value is the first value and the output of the second DC/DC converter is equal to or smaller than the threshold value is established; and
the electronic control unit is configured to maintain the counted period when a second state in which the output command value is the second value and the output of the second DC/DC converter is equal to or smaller than the threshold value is established.

6. A solar control method of controlling a solar power generation system using an electronic control unit, the solar power generation system having at least one first group including a solar panel and a first DC/DC converter and at least one second group including a second DC/DC converter and a battery, at least one of the at least one first group and the at least one second group being a plurality of the first groups or the second groups, the first DC/DC converter being configured to output electric power generated by the solar panel to a first power line, the second DC/DC converter being configured to output electric power received via the first power line, to a second power line, the battery being connected to the second power line, the solar control method comprising
setting an output command value for the second DC/DC converter by the electronic control unit such that the output command value periodically switches between a first value and a second value that is smaller than the first value, when an output of the second DC/DC converter is equal to or smaller than a threshold value; and
determining by the electronic control unit that the second DC/DC converter is abnormal when the output command value and the output of the second DC/DC converter satisfy a predetermined condition.

7. A vehicle comprising:
a solar power generation system; and
a solar control device configured to control the solar power generation system,
wherein the solar power generation system has at least one first group including a solar panel and a first DC/DC converter and at least one second group including a second DC/DC converter and a battery, at least one of the at least one first group and the at least one second group being a plurality of the first groups or the second groups, the first DC/DC converter being configured to output electric power generated by the solar panel to a first power line, the second DC/DC converter being configured to output electric power received via the first power line, to a second power line, the battery being connected to the second power line, and
wherein the solar control device includes an electronic control unit configured to set an output command value for the second DC/DC converter such that the output command value periodically switches between a first value and a second value that is smaller than the first value, when an output of the second DC/DC converter is equal to or smaller than a threshold value, and determine that the second DC/DC converter is abnormal when the output command value and the output of the second DC/DC converter satisfy a predetermined condition.

8. The vehicle according to claim 7, wherein the predetermined condition comprises a condition that a period for which the output command value is the first value and the output of the second DC/DC converter is equal to or smaller than the threshold value is equal to or greater than a first predetermined period.

9. The vehicle according to claim 8, wherein:
the electronic control unit is configured to keep the output command value at the first value for a second predetermined period after switching the output command value from the second value to the first value;
the electronic control unit is configured to keep the output command value at the second value for a third predetermined period after switching the output command value from the first value to the second value; and
the electronic control unit is configured to determine that power generation by the solar panel is stopped, when a fourth predetermined period has elapsed since the output of the second DC/DC converter became equal to or smaller than the threshold value.

10. The vehicle according to claim 9, wherein the first predetermined period, the second predetermined period, the third predetermined period, and the fourth predetermined period satisfy a relationship that (the first predetermined period)<(the second predetermined period)×(the fourth predetermined period)/{(the second predetermined period)+ (the third predetermined period)}.

11. The vehicle according to claim 7, wherein:
the electronic control unit is configured to count a period for which a first state in which the output command value is the first value and the output of the second DC/DC converter is equal to or smaller than the threshold value is established; and
the electronic control unit is configured to maintain the counted period when a second state in which the output command value is the second value and the output of the second DC/DC converter is equal to or smaller than the threshold value is established.

\* \* \* \* \*